(12) United States Patent
Yoon

(10) Patent No.: US 9,097,440 B2
(45) Date of Patent: Aug. 4, 2015

(54) SOLAR LIGHT ROOF PANEL ABUTMENT STRUCTURE

(75) Inventor: Seok Kyu Yoon, Goyang-si (KR)

(73) Assignee: I-SOLAR ENERGY CO., LTD., Goyang-Si, Gyeonggi-Do (KR)

( * ) Notice: Subject to any disclaimer, the term of this patent is extended or adjusted under 35 U.S.C. 154(b) by 0 days.

(21) Appl. No.: 14/345,576

(22) PCT Filed: Dec. 26, 2011

(86) PCT No.: PCT/KR2011/010078
§ 371 (c)(1),
(2), (4) Date: Mar. 18, 2014

(87) PCT Pub. No.: WO2013/047957
PCT Pub. Date: Apr. 4, 2013

(65) Prior Publication Data
US 2014/0345212 A1 Nov. 27, 2014

(30) Foreign Application Priority Data
Sep. 27, 2011 (KR) .................. 20-2011-0008641 U

(51) Int. Cl.
*E04D 13/00* (2006.01)
*F24J 2/52* (2006.01)
(Continued)

(52) U.S. Cl.
CPC ... *F24J 2/52* (2013.01); *E04D 3/35* (2013.01); *E04D 3/352* (2013.01); *E04D 3/355* (2013.01); *E04D 3/362* (2013.01); *E04D 13/00* (2013.01)

(58) Field of Classification Search
CPC ............ F24J 2/52; E04D 13/00; E04D 3/352; E04D 3/362; E04D 3/363; E04D 3/30; E04D 3/3607; E04D 3/355; E04D 3/366; E04D 3/35

USPC ................ 52/173.3, 506.05, 506.07, 506.08, 52/506.1, 546, 520, 521; 136/244, 251
See application file for complete search history.

(56) References Cited

U.S. PATENT DOCUMENTS 3,606,720 A * 9/1971 Cookson ......................... 52/714
4,486,998 A * 12/1984 Hague ............................. 52/478
(Continued)

FOREIGN PATENT DOCUMENTS

JP 2005-282124 10/2005
KR 2000-0025876 5/2000
(Continued)

OTHER PUBLICATIONS

International Search Report for International Application No. PCT/KR2011/010078 dated Jul. 24, 2012.

*Primary Examiner* — Brent W Herring
(74) *Attorney, Agent, or Firm* — Kile Park Reed & Houtteman PLLC

(57) ABSTRACT

A roof panel abutment structure is disclosed. The structure comprises; a roof frame, a first roof panel having one end coupled to the roof frame, the one end formed in a shape in which a recess is inserted between a pair of ridges on a cross section thereof, a bolt fastened to the recess portion to fix the first roof panel to the roof frame; a second roof panel having an opposite end thereof coupled to one end of the first roof panel; a first adaptor having a base and a wing portion connected to both side of the base, wherein the base is fixed to the recess portion by means of the fastening of the bolt, and the wing portion is coupled to both side of T groove, a second adaptor formed in a shape corresponding to the shape of T groove, a clamp installed such that a bottom is coupled to the second adaptor, and a solar panel coupled to the clamp and installed to cover the roof panel. The roof panel abutment has increased strength, and even if a portion of the roof panel is deformed, the upper panel is not disengaged so as to maintain the abutment structure.

6 Claims, 3 Drawing Sheets

(51) Int. Cl.
*E04D 3/362* (2006.01)
*E04D 3/35* (2006.01)

(56) References Cited

U.S. PATENT DOCUMENTS 5,524,409 A * 6/1996 Kaiser ........................... 52/588.1
6,254,397 B1 * 7/2001 Elmer ............................... 439/6
7,104,020 B1 * 9/2006 Suttle ............................. 52/551
8,341,917 B2 * 1/2013 Resso et al. ................... 52/741.4
8,793,951 B2 * 8/2014 Resso et al. ................... 52/302.1
2011/0232212 A1 * 9/2011 Pierson et al. ............... 52/173.3

FOREIGN PATENT DOCUMENTS

| KR | 20-0403767 | 12/2005 |
| KR | 10-0957530 | 5/2010 |
| KR | 10-2011-0058294 | 6/2011 |

* cited by examiner

SOLAR LIGHT ROOF PANEL ABUTMENT STRUCTURE

TECHNICAL FIELD

The invention relates to solar light roof panel abutment structure, and more particularly to a roof panel structure on which the solar module panel could be easily attached.

BACKGROUND ART

Recently, as the environment-friendly and renewable energy technology is in the spotlight, the developments of solar light panel associated technology are widely carried out, in which the solar module panels are installed on the roof of building and the eco-friendly energy is produced from the solar module panel.

The dry construction method in which the prefabricated wall panel and roof panel are attached on the structural frame has advantages in that its' construction period is shorter than that of the wet construction method and the process of the dry construction is generally simpler and easier than the process of the wet construction, and if the shape or structure of the roof panel are properly changed, it can be engaged with the solar module panel.

But, according to the conventional dry construction method in which the solar panels are attached on the roof panels, the joint or abutment between the roof panel is made only by the engagement of the roof panels, so the structural strength of the joint between roof panels is weak, and if the edge of the roof panel is deformed, the engagement structure of the joint of the roof panels may be broken up.

And, as the position of the fasteners to secure the solar module panel on the roof panel is fixedly determined on the roof panel, the position of the solar panels could not be easily changed, and the installing of the conventional fasteners requires complicated and hard working.

Korean patent laid-open No. 2000-0025876 discloses the attaching structure to secure to solar panel frame on the roof of building, in which the solar panel frame includes a solar panel, a pair of supports bearing both end of the solar panel and extending downwards, a first bracket attached on the lower end of one support, a second bracket attached on the upper end of the other support. Plural bases to secure the frame have the bolt extending upward and are arranged with the interval corresponding to the interval of the support. The first and the second brackets are fastened by bolt and nut on one pair of adjacent bases and the frame is secured on the base, and the second bracket is clamped to the upper side of the bolt on which the first bracket of the other frame is clamped. Accordingly, if the nuts clamped on the first and second brackets of the frame to be repaired and the second bracket of the adjacent frame are released, only the solar panel frame can be removed, so repairing and reassembling works of the solar panel frame is very easy.

Korean patent No. 0957530 discloses a clamp for solar module panel, in which the profile enclosing the solar module panel could be easily fixed on the roof of building, and the weight of the profiles is widely distributed along the roof.

DISCLOSURE

Technical Problem

The invention is provided to solve the above mentioned problems and the object of the invention is to provide the roof panel abutment structure which has the increased structural strength of the joint of the roof panels so that the joint of the roof panel should not be disengaged though the roof panel is deformed, and in which the solar panel could be easily installed by inserting it into the roof panel without use of bolt and the installing position could be adjusted.

Technical Solution

According to an aspect of the present invention, there is provided a roof panel abutment structure which includes a roof frame; a first roof panel which has one end being fastened on the roof frame and having two ridges and a recess between them in section; a bolt being fastened at the recess of the first roof panel to fix it on the roof frame; a second roof panel which has the other end covering the two ridges and the recess of the first roof panel and having a T groove with inverted T shape and facing the recess of the first roof panel; a first adaptor having a base fastened at the recess of the first roof panel by said bolt and a pair of wings extending upward from both end of base and engaged to the side walls of the T groove of the second roof panel; a second adaptor shaped corresponding to the T groove and inserted in and movable along the T groove; a clamp the lower portion of which is fastened to the second adaptor; a solar panel engaged with the upper portion of the clamp and covering the roof panel.

According to the other aspect of the invention, the distal portion of said other end of the second roof panel is bent in the shape of clip, and the ridge of said one end of the first roof panel corresponding to the distal portion of said other end of the second roof panel is bent in the shape of engaging groove, so that said other end of the second roof panel could be engaged with said one end of the first roof panel by engaging the distal portion of the second roof panel into the engaging groove of the first roof panel.

According to another aspect of the invention, the end of the wings of the first adaptor is bent in the shape of clip corresponding to the shape of the side wall of the T groove of the second roof panel, so that the wings of the first adaptor could be engaged to the side wall of the T groove of the second roof panel.

According to still another aspect of the invention, the second adaptor can be inserted into the T groove of the second roof panel at an arbitrary position along the T groove of the second roof panel.

Advantageous Effects

According to the invention, the first adaptor is fastened to the roof frame by the bolt together with the first roof panel and it reinforces the strength of the roof panel joint. So even though the roof panel is deformed, the roof panel and the upper solar panel would not be disengaged and the structure of the roof panel joint would be maintained.

And as the second adaptor which is shaped corresponding to the T groove is inserted in the T groove movably, and the clamp is fastened to the second adaptor, the clamp could be easily assembled with the T groove of the second roof panel without bolting to the second roof panel, and the position of clamp could be easily adjusted, so the position of the solar roof panel could be also easily adjusted.

DESCRIPTION OF THE DRAWINGS

The above and other objects and advantages of the invention will become more apparent by describing the preferred embodiments with reference to the accompanying drawings in which.

BEST MODE

Figure 1:
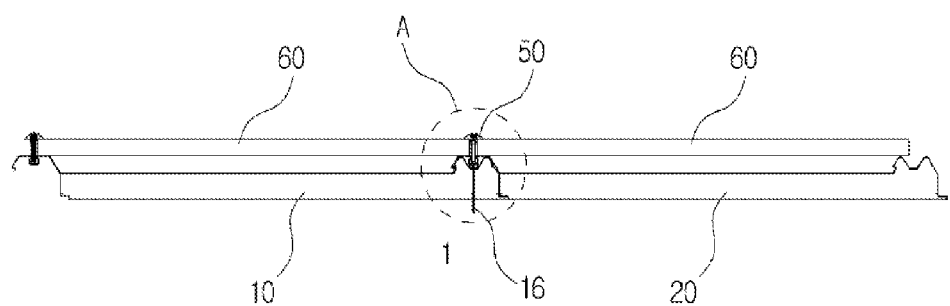
FIG. 1 is a sectional view of one embodiment of the invention.

According to the embodiment of the invention, the roof abutment or joint structure is configured to have a structure in that one end of the first roof panel 10 is fastened to the roof frame 1 together with the first adaptor 30 by use of bolt 16, and the other end of the second roof panel 20 is overlapped on and engaged with said one end of the first roof panel 10 by inserting the T groove 22 formed at said other end of the second roof panel 20 into the first adaptor 30, which will increase the structural strength of the roof panel joint.

And, instead of fastening the clamp 50 on the T groove 22 of the second roof panel 20 directly, the second adaptor 40 in shape corresponding to the T groove 22 is inserted into the T groove 22, and the clamp 50 is fastened to the second adaptor 40, and the solar panel 60 is installed on the clamp 50.

The roof frame 1 is a structural frame to support the roof panel and is made such as I beam and C beam. One end of the first roof panel 10 is fastened on the roof structure. Sandwich panel may be used as a roof panel. The sandwich panel is constructed to be abutted continuously as the complementarily shaped adjacent edges are jointed to each other, and it can achieve short construction period and high heat insulation. But various type of other roof panel can be used so long as the first adaptor 30 or the second adaptor 40 can be installed.

One end of the first roof panel 10 according to the invention has a pair of ridges 12 and a recess 4 between them in section. An engaging groove 30 is formed by bending on the ridge of the end of the first roof 10, and a clip is formed by bending on the other end of the second roof panel 20. The clip of the second roof 20 is engaged with the engaging groove 30 of the first roof panel 10 to achieve more secure engagement between the roof panels and improved water proof. (Referring to FIG. 2) The first roof panel 10 may be the same with the second roof panel 20, but they may have different shape to each other.

A bolt 16 is fastened on the recess 14 of the first roof panel 10 into the roof frame 1. And the other end of the second roof panel 20 is overlapped on and engaged with the one end of the first roof panel 10 to achieve an abutment or joint of the roof panel. Then the other end of the second roof panel 20 covers the two ridges 12 and the recess 14 and the bolt 16 fastened on the recess 14 of the first roof panel 10. Therefore, the bolt 16 is shielded from the outside, so the rain water could not infiltrate into the bolt hole.

Figure 2:
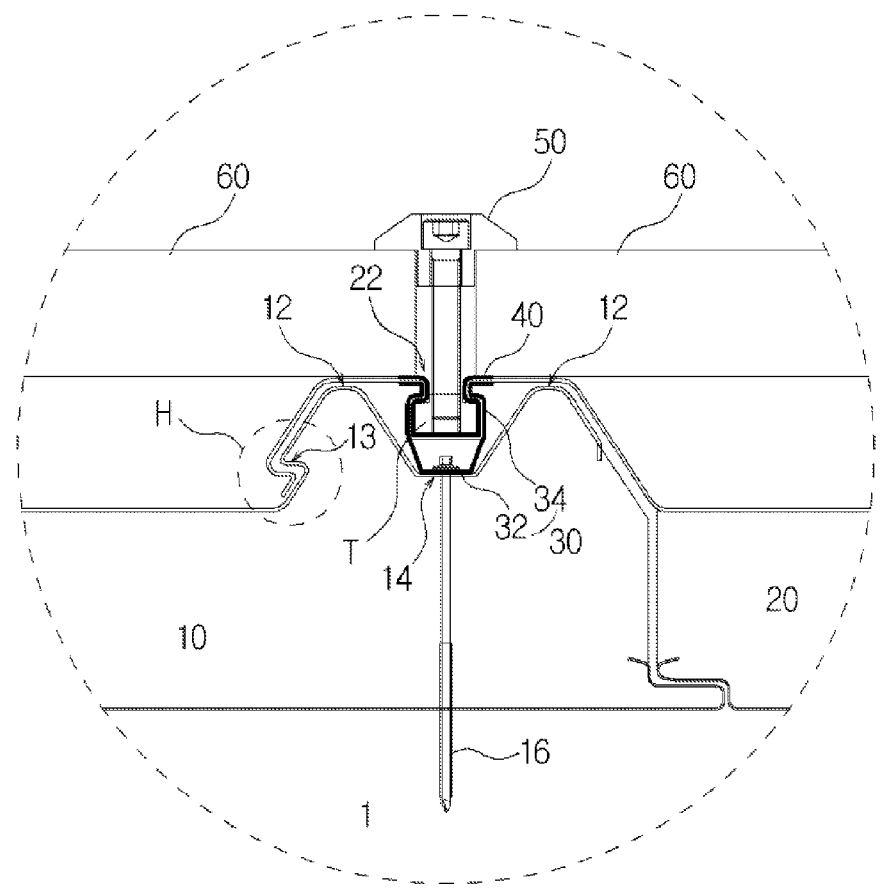
FIG. 2 is an enlarged view of 'A' portion in FIG. 1.

As shown in FIG. 2, an inverted T groove 22 is formed on the other end of the second roof panel 20 at the part facing the recess 14 of the first roof panel 10. This T groove 22 accommodates the second adaptor 40 as mentioned below.

The first adaptor 20 of the embodiment of the invention has a base 32 and a pair of wings 34 extending upward from both end of the base 32. The base 32 is fastened by bolt 16 on the recess 14 of the first roof panel 10. The wings 34 are shaped as corresponding to the T groove 22 so as to be engaged with the side walls of the T groove 22 of the second roof panel 20 when the other end of the second roof panel 20 is overlapped on the one end the first roof panel 10. As shown in FIG. 2, the both side walls of the T groove 22 are bent to form engaging projections, and the distal ends of the wings 34 of the first adaptor 30 are bent to be engaged with the engaging projections of the side walls of T groove 22. The first adapter 30 is formed to extend along the longitudinal direction of the roof panel (for example, as long as 50 mm to 100 mm).

As mentioned above, as the first adaptor 30 is placed on the recess 14 of the first roof panel 10 and the first adaptor 30 and the first roof panel 10 are fastened together to the roof frame 1 by the bolt 16, the strength or rigidity of the joint of the roof panel is increased. And if the engagement between the roof panels (such as 'H' in FIG. 2) is deformed and the end of the second roof panel is disengaged, the total joint structure of the roof panel would not be disassembled, so the upper components such as the solar panel or the clamping parts thereof) may not be disengaged and be kept firmly in normal position.

The second adaptor 40 inserted in the T groove 22 of the second roof panel 20 is shaped as corresponding to the T groove 22 as shown in FIG. 2, and is made of steel, aluminum, plastic or other proper materials. The second adaptor 40 is preferably inserted in the T groove 22, but it may be omitted and removed from the T groove 22 of the second roof panel 20 selectively on construction condition. The clamp 50 is fastened to the second adaptor 40 or the T groove 22 at the lower end. A nut such as T nut may be used to fasten the lower end of the clamp 50 to the second adaptor 40 or the T groove 22.

As the second adaptor 40 is made in the same shape with the T groove 22, the second adaptor 40 is movable along the T groove 22, that is, along the length direction of the roof panel. As the clamp 50 is fastened at the second adaptor 40, the clamp 50 and the solar panel 60 engaged with the upper portion of the clamp 50 may also be freely moved along the T groove 22 of the second roof panel 20. The second adaptor 30 preferably has a length of 50 mm to 100 mm.

As the second adaptor 40 is inserted into the T groove 22 of the second roof panel 20, the strength of the assembling structure between the second roof panel 20 and the upper components such as the clamp 50 and the solar panel 60 may be increased, and the insert type assembling method is relatively easy and simple, and the inserted position of the second adaptor 40 may be adjusted freely. The second adaptor 40 can be assembled by inserting it to the T groove 22 of the second roof panel 20 without use of bolt or other fastener, so the assembling work is easy and the construction period and cost could be reduced.

After the second adaptor 40 is fastened to the T groove 22 of the second roof panel 20, the solar panel 60 is placed to cover the roof panel 10, 20. To do this, the clamp 50 is fastened to the T groove 22 of the second adaptor 40. The clamp 50 is a metal part to connect the solar panel 60 to the second adaptor 40. The clamp 50 may be made as a one body with the lower part of the solar panel 60, or it may be made as a separate part and attached to the solar panel 60. As the second adaptor 40 and the clamp 50 fastened to the second adaptor 40 are movable along the T groove 22 of the second roof panel 20, the solar panel 60 attached to the upper portion of the clamp 50 may also be movable, so the position of the solar panel 60 may be adjusted easily on the roof panel.

Figure 3:
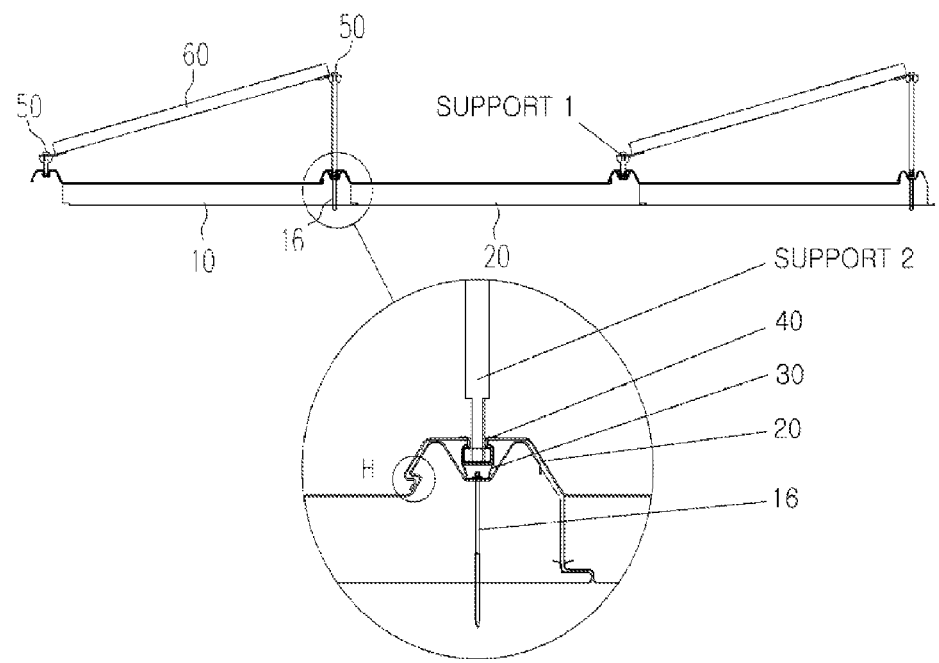
FIG. 3 is a sectional view of another embodiment of the invention.

FIG. 3 shows another embodiment of the invention, in which simple members such as rod type support 1 and 2 are added so that the solar panels 60 could be supported slantingly. A nut such as T nut may be used to clamp the support 1, 2 on the T groove 22 or the second adaptor 40.

As described above, the invention has been described with respect to particularly preferred embodiments. However, the invention is not limited to the above embodiments, and it is possible for one who has an ordinary skill in the art to make various modifications and variations, without departing off the spirit of the invention. Thus, the protective scope of the invention is not defined within the detailed description thereof but is defined by the claims to be described later and the technical spirit of the invention.

The invention claimed is:

1. A roof panel abutment structure which includes
a roof frame;
a first roof panel which has one end being fastened on the roof frame and having two ridges and a recess between them in section;
a bolt being fastened at the recess of the first roof panel to fix it on the roof frame;
a second roof panel which has an end structure covering the two ridges and the recess of the first roof panel and having a T groove with inverted T shape and facing the recess of the first roof panel;
a first adaptor having a base fastened at the recess of the first roof panel by said bolt and a pair of wings extending upward from both end of base and engaged to the side walls of the T groove of the second roof panel;
a second adaptor shaped corresponding to the T groove is inserted in and movable along the T groove of the second roof panel, and the lower portion of the clamp is fastened to the second adaptor;
a clamp having a lower portion of which is fastened to the T groove of the second roof panel;
a solar panel engaged with the upper portion of the clamp and covering the roof panel.

2. A roof panel abutment structure of claim 1, wherein the second adaptor can be inserted into the T groove of the second roof panel at an arbitrary position along the T groove of the second roof panel.

3. A roof panel abutment structure of claim 2, wherein the distal portion of said other end of the second roof panel is bent in the shape of clip, and the ridge of said one end of the first roof panel corresponding to the distal portion of said other end of the second roof panel is bent in the shape of engaging groove, so that said other end of the second roof panel could be engaged with said one end of the first roof panel by engaging the distal portion of the second roof panel into the engaging groove of the first roof panel.

4. A roof panel abutment structure of claim 2, wherein the end of the wings of the first adaptor is bent in the shape of clip corresponding to the shape of the side wall of the T groove of the second roof panel, so that the wings of the first adaptor could be engaged to the side wall of the T groove of the second roof panel.

5. A roof panel abutment structure of claim 1, wherein the distal portion of said other end of the second roof panel is bent in the shape of clip, and the ridge of said one end of the first roof panel corresponding to the distal portion of said other end of the second roof panel is bent in the shape of engaging groove, so that said other end of the second roof panel could be engaged with said one end of the first roof panel by engaging the distal portion of the second roof panel into the engaging groove of the first roof panel.

6. A roof panel abutment structure of claim 1, wherein the end of the wings of the first adaptor is bent in the shape of clip corresponding to the shape of the side wall of the T groove of the second roof panel, so that the wings of the first adaptor could be engaged to the side wall of the T groove of the second roof panel.

\* \* \* \* \*